United States Patent [19]

Lappi et al.

[11] 4,445,971

[45] May 1, 1984

[54] METHODS OF FOAM INHIBITION OR DEPRESSION

[75] Inventors: Susan C. Lappi, Lakeville; James E. Maloney, Eagan, both of Minn.

[73] Assignee: Economics Laboratory, Inc., St. Paul, Minn.

[21] Appl. No.: 379,582

[22] Filed: May 19, 1982

Related U.S. Application Data

[63] Continuation of Ser. No. 162,315, Jun. 23, 1980, abandoned.

[51] Int. Cl.³ .............................................. D21H 3/02
[52] U.S. Cl. .................................... 162/158; 252/321; 252/358
[58] Field of Search ...................... 162/158, 164.1, 72, 162/77; 252/321, 358

[56] References Cited

U.S. PATENT DOCUMENTS

| | | | |
|---|---|---|---|
| 2,686,766 | 8/1954 | Silverstein et al. | 252/358 |
| 2,792,374 | 5/1957 | Bradley et al. | 252/358 |
| 3,056,687 | 10/1962 | Stephan | 252/358 |
| 3,215,635 | 11/1965 | Liebling et al. | 252/358 |
| 3,277,217 | 10/1966 | Nehmsmann | 252/358 |
| 4,024,072 | 5/1977 | Shane et al. | 252/358 |

FOREIGN PATENT DOCUMENTS 45-25842  8/1970  Japan .................................. 162/72

*Primary Examiner*—Peter Chin
*Attorney, Agent, or Firm*—Merchant, Gould, Smith, Edell, Welter & Schmidt

[57] ABSTRACT

Methods of foam inhibition or depression in industrial milieu. The present methods generally involve the use of certain nonionic surfactants having the structure:

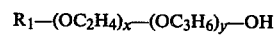

$$R_1\text{—}(OC_2H_4)_x\text{—}(OC_3H_6)_y\text{—}OH$$

wherein $R_1$ is a monovalent organic hydrophobic moiety or hydrophobe, preferably selected from the group consisting of long chain or higher molecular weight primary or secondary alcohols, alkyphenols, or mixtures thereof; x is the value of the average number of moles or units of ethylene oxide per defoamer molecule and has a value in the range of 3 to 20, preferably 5 to 15; y is the average number of moles or units of propylene oxide per molecule of defoamer and has a value in the range of from 15 to 60, preferably 20 to 50.

28 Claims, 1 Drawing Figure

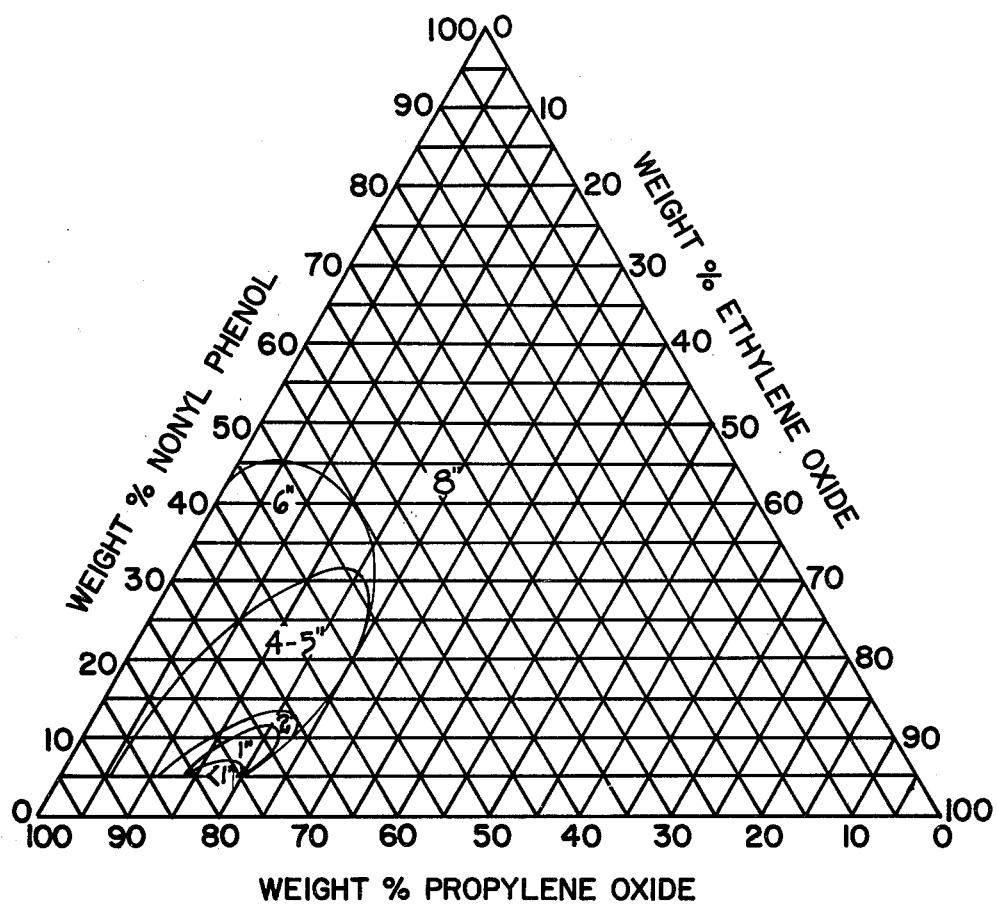

METHODS OF FOAM INHIBITION OR DEPRESSION

This application is a continuation of application Ser. No. 162,315, filed June 23, 1980, now abandoned.

The present invention relates to methods of controlling, suppressing, or inhibiting the generation of foam in aqueous industrial media. More particularly, the present invention provides a method for controlling foam which is particularly suited to paper mill and pulp mill applications.

Excess foam generation is an undesirable, incidental feature of many aqueous industrial transport and processing systems. Excess foam tends to reduce processing machinery efficiency and thereby to increase end product costs. An aqueous industrial medium or environment which has long encountered the problem of excessive foaming is that of paper mill or pulp mill processing. Foaming (e.g., from the presence of wood resins) occurs in pulp and paper mills at a number of locations and many formulations have been suggested to control such foam. Generally speaking, the formulations suggested are selected for a particular location in the mill. Such locations include the brown stock washer wherein hot pulp is washed to remove entrained pulping liquor, the screening section wherein the washed pulp from the brown stock washer is subjected to displacement washing and cooling prior to passage to the bleach plant, and the paper making machine where the bleached pulp is formed into paper. In the first of the two locations, foaming generally occurs in an alkaline aqueous medium while, in the latter, foaming generally occurs in an acidic aqueous medium.

The present invention discloses a method for controlling foam in aqueous industrial media having a tendency to foam such as the above-described media commonly found in a paper or pulp mill. The process comprises subjecting a foaming or potentially-foaming aqueous system to the action of an effective amount of a defoamer or antifoamer herein described, thereby causing the foaming properties of the liquid to be diminished, suppressed or destroyed.

Briefly, in one aspect, the present invention is a process for inhibiting foam or foaming in an aqueous industrial liquid having a tendency to do so, the process comprising the step of adding to the liquid a foam depressant, inhibitor or defoamer in an amount effective to reduce or eliminate foam, the defoamer comprising polyether chain consisting essentially of polyethylene oxide (EO) "block" residue or condensate having attached on one end thereof poly 1,2, propylene oxide (PO) "block" residue which is hydroxyl terminated, there being on the remaining end of the poly (EO) residue organic hydrophobic moiety or hydrophobe. To achieve the advantageous defoaming which is possible in the practice of present invention, the hydrophobe must generally comprise about 3% to about 50% weight percent of the defoamer, the remainder being the above described polyether chain. Further, the PO/EO ratio of the polyether chain is generally greater than 1:1, and is preferably in the range of about 3:1. Generally speaking, the defoamer is conveniently dissolved or dispersed in a carrier which may be inorganic such as water or organic such as mineral oil.

In a preferred practice of this invention, the aqueous liquid is the processing stream of a paper mill or pulp mill, the foaming being due to the presence of wood resins, lignin sulfonates, surface active processing or furnish additives, and mechanically induced air entrainment.

In another preferred practice of the invention, the above liquid defoamer composition further comprises an adjuvant amount of phosphorylated synthetic or fatty alcohol mono, di or triester.

In yet another preferred practice of this invention, the above-described defoamer composition further comprises a wax-like material such as pentaerythritol tetrastearate. Such a wax-like material has previously been used in defoaming compositions and has been found to be particularly useful herein.

As the term is used herein, "inhibit" is meant to include all corrective or preventive measures which could be taken to eliminate the problems engendered by excessive foaming. "Inhibit" is specifically intended to include the destruction, reduction or prevention of foam as well as the reduction or elimination of entrained air. Thus, by reduction or elimination of entrained air (which may occupy up to about 15% of the volume of the processing stream which is subjected to severe mechanical agitation), the efficiency of the process will be increased even though the process stream may appear to the unaided eye to have substantially no change in the amount of surface foam before and after the addition of the present defoamer. "Hydrophobe or hydrophobic moiety" as the term is used herein is meant to include monovalent, substantially hydrocarbon moieties which are essentially water insoluble and which generally have molecular weights in the range of 100 to 350. As is more completely discussed below, preferred hydrophobes include alkylphenol moieties and moieties of higher molecular weight saturated or unsaturated alcohols or mixtures thereof.

In applying the present process to the reduction or destruction of foam in aqueous media, the materials herein described are admixed with the potentially or actually foaming aqueous material (in a suitable proportion), virtually by any desired or suitable procedure. The materials may be poured, sprayed or added to the body of the foam or disposed on top of the liquid thereby reducing or removing the foam thereof. Adding the present materials to the liquid underlying already-formed foam is another approach within the contemplation of the present method.

BRIEF DESCRIPTION OF THE FIGURE

The FIGURE is a triangular coordinate depiction of foam height measurement as a function of defoamer composition.

DETAILED DESCRIPTION OF THE INVENTION

The foam inhibiting compositions useful in the present invention comprise nonionic polyethers having a polyethylene oxide condensate residue or segment $(-OC_2H_4-)_x$ attached to a hydroxy-terminated $(-OH)$ poly 1, 2 propylene oxide condensate segment or residue $(-OC_3H_6-)_yOH$, the remaining end of the polyethylene oxide segment being attached to a relatively hydrophobic organic moiety such as an alkylphenol, higher molecular weight alcohols or mixtures thereof. The defoaming compositions of the present invention might be represented by the structure:

$$R_1-(OC_2H_4)_x-(OC_3H_6)_y-OH \qquad \text{I}$$

wherein $R_1$ is a monovalent organic hydrophobic moiety or hydrophobe, preferably selected from the group consisting of long chain or higher molecular weight primary or secondary alcohols, alkyphenols, or mixtures thereof; x is the value of the average number of moles or units of ethylene oxide per defoamer molecule and has a value in the range of 3 to 20, preferably 5 to 15; y is the average numer of moles or units of propylene oxide per molecule of defoamer and has a value in the range of from 15 to 60, preferably 20 to 50.

In order to achieve the advantageous defoaming properties of the compositions described herein, it has been found that both the relative amounts and relative locations of the EO and PO segments must be as described herein. Compositions have the same relative amounts of ethylene oxide and propylene oxide residues (i.e., same weight percentages) wherein the ethylene oxide and propylene oxide appear as random segments are not useful defoamers and are not included within the scope of the present invention. Thus, the present invention contemplates the use of a defoamer comprising an organic hydrophobe as described above, bonded to a segment or "block" of repeating ethylene oxide units (such as would result from the ring opening condensation of "x" moles of ethylene oxide into a chain), which in turn is attached to a second segment or block of repeating propylene oxide units (such as would result from the condensation of y moles of 1,2, propylene oxide), the propylene oxide block being hydroxy-terminated.

As noted above, in the practice of the present invention very specific amounts of organic hydrophobe, EO and PO segments are required in the defoamer in order for the advantageous foam control of the present invention to be achieved. In particular, when a preferred alkylphenol hydrophobe (such as nonylphenol) is employed, it has been found that particularly noteworthy foam inhibition is achieved (in paper mill milieu) if the polyether chain has an average of 12.5 repeating EO units, i.e., an average of 12.5 moles, and from 25 to 60 PO units should be added to the chain to produce the defoamer.

With reference to the FIGURE, the criticality of the hydrophobe/EO/PO weight ratio in controlling foam due to the presence of other surfactants may be seen. The FIGURE shows in triangular coordinates, the fairly narrow defoamer composition ranges which provide the foam inhibiting characteristic which could be achieved in the practice of this invention in its preferred paper or pulp mill embodiment. There is shown on each axes of the FIGURE, the weight percent hydrophobe, weight percent polyethylene oxide residue and weight percent 1,2 polypropylene oxide residue, respectively. The numbers within the countour zones of the FIGURE are foam heights (in inches) determined according to the test described below.

Characterization of foam inhibiting performance of the defoamers herein is an internal test developed by the assignee of the present invention. The present test has been found to predict the foam inhibiting ability of a given defoamer under actual industrial processing conditions (e.g., in a paper mill).

Foam height measurements were made by adding approximately 100 parts per million (ppm) of the defoamer to be tested to 3 liters of 70° F. (21° C.) water contained in a temperature-controllable, metal, 3 liter beaker. The defoamer was dissolved or dispersed in preferred organic mineral oil carrier and comprises approximately 80% by weight mineral seal oil and 20% by weight defoamer. Thus, the entire defoamer composition was added to a 500 ppm concentration. The water in the beaker contained approximately 50 ppm nonyl phenol-EO having an average of 9.5 moles EO per nonylphenol nucleus. This alkylphenol polyether surfactant is a high foaming surfactant commonly used in paper/pulp operations, particularly if simultaneous or subsequent deinking or decontamination of cellulosic fiber is desired. Upwardly projecting from the rim of the metal beaker so as to contain foam generated therein is a transparent glass cylinder. The glass cylinder has an exterior vertical ruler for measuring the height of a column of foam generated therein. Disposed near the open end of the glass cylinder and directed into the metal beaker is a number 30/15 "V-Jet" spray nozzle which is in communication with a pressure controllable water pump. The water pump circulates the contents of the beaker through the nozzle thereby not changing the concentration of materials therein. For purposes of the evaluations herein, a pressure of 6 psi (42 kPa) was provided by the pump to the nozzle. A short period of time after activation of the pump, an equilibrium foam height is produced in the glass cylinder, this equilibrium foam height being characteristic of the defoamer being tested.

After activation of the pump, foam height readings then were taken once per minute for 15 minutes. The average of those 15 foam heights then was determined. "Acceptable" defoaming of foam inhibition or depression for purposes of this invention is an average foam height over a 15 minute time period of about 5 inches or less. Zones of acceptable defoaming performance are indicated in the FIGURE and are set off within the 4"–5" region. For purposes of comparison under the above conditions, a 50 ppm nonylphenol $(EO)_{9.5}$ aqueous solution with none of the present defoamer compositions produced a foam height in excess of 9 inches in about 2 minutes and caused pump cavitation and loss of pressure.

In a further verification of the defoaming effectiveness of compositions within the scope of the present claims, a separate run of the defoamers in water was made (i.e., no hydrocarbon carrier was used). It was found that the defoamers performed adequately in an aqueous carrier, defoaming zones similar to those of the FIGURE resulting. Since the organic mineral oil carrier is not necessary to the efficacy of the present invention, the defoamers may be dispersed or dissolved in an organic or an aqueous carrier. However, the defoamers did not perform as well in water as in organic hydrocarbon carriers, the defoamer in the organic medium appearing to be less sensitive to small changes in PO/EO ratios. Hence, organic materials such as naphthenic oils, mineral oils, paraffin oils or kerosene are the preferred carriers herein. The most preferred carrier for the defoamer is mineral oil, preferably there being 80% by weight mineral oil and 20% by weight defoamer in the defoamer composition.

The alkylphenol polyether defoamers constitute a particularly preferred class of defoamers herein. These alkylphenol polyethylene oxide-hydroxyl-terminated polypropylene oxides are generally prepared from alkylphenol-polyethylene oxide starting materials. Alkylphenol-polyethylene oxide starting materials are a well known class of surfactants that have long been used in many different industrial processes. Such conventional materials have a structure

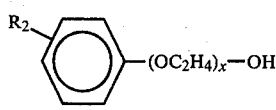

wherein $R_2$ is a linear or branched, saturated or unsaturated monovalent hydrocarbon radical having from 6 to 18 carbon atoms, preferably having from 8 to 12 carbon atoms and in a preferred sense could be empirically representable by the homologous formula $C_aH_{2a+1}$ (preferably, there is but one $R_2$ attached to the phenol nucleus, but multiple $R_2$'s are within the contemplation of this invention); x has a value of from 3 to 20 (preferably 5 to 15), each (—$OC_2H_4$—) unit being derived from the ring opening of ethylene oxide

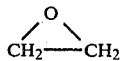

also known as oxirane. (Alkyl chains are sometimes represented herein by "$C_a$" wherein "a" is the number of carbon atoms in the chain, e.g., $C_{12}$ or $C_{12-14}$ where a mixture of chains is intended. This representation should be understood to represent any saturated or unsaturated, branched or linear hydrocarbon moiety having "a" carbon atoms. Where a saturated species is intended, "$C_a$" could be expanded to the empirical formula for the moiety of $C_aH_{2a+1}$ viz., $C_9H_{19}$. A particularly preferred class of starting materials for synthesis of alkylphenol polyethers herein are nonylphenol polyethylene oxides (NP—EO).

Nonylphenol-polyethylene oxides useful in the present invention are characterized by the presence of a nine carbon atom alkyl chain attached to the aromatic nucleus (in ortho, meta or para position with respect to the polyether chain), a hydroxy-terminated polyether chain having from 3 to 20 ethylene oxide units (i.e. x has a value of 3 to 20). Where defoaming in a paper or pulp mill environment is contemplated x preferably has a value of 5 to 15, more preferably 8 to 14. While such conventional NP—EO's can be synthesized in fairly pure fractions with a fairly specific value of x, they are generally sold as mixtures of molecules having a range of x values. These mixtures are characterized by their average value of x and hence, a common material is NP—$EO_{9.5}$ which has an average of 9.5 ethylene oxide units (moles) per nonylphenol nucleus (x=9.5). Nonylphenol-polyethylene oxides having average x values from 3 to 20 are commercially available from various companies including the GAF Corp. under the trade designation "Igepal", Rohm and Haas Company under the trade designation "Triton" and Jefferson Chemical Company under the trade designation "Surfonic".

The present invention utilizes hydrophobe-polyethylene oxide moieties having attached to the distal end of the polyethylene oxide chain, a plurality of 1,2 polypropylene oxide units (—$OC_3H_6$—)$_y$, the polypropylene oxide chain preferably being hydroxy-terminated, the structure of the defoamer material being that of formula I. It has been found necessary for the polyethylene oxide segment to be positioned adjacent to the hydrophobic moiety in order to achieve the advantageous defoaming characteristics possible in the practice of this invention.

The hydroxy-terminated nonylphenol-polyethylene oxide-polypropylene oxides (NP—$EO_x$—$PO_y$—OH) of the present invention are prepared according to methods which are well known to one skilled in the art. For example, NP—$EO_xPO_y$—OH may be prepared by reacting NP—$EO_x$ (e.g., "Igepal" or "Triton") with propylene oxide at e.g., 100° C. to 150° C., under 1 to 4 atmospheres air pressure, in the presence of an alkaline catalyst, e.g., KOH. U.S. Pat. No. 3,021,372 to Dupre et al. specifically describes a preparation of the preferred hydroxy-terminated octylphenol and nonylphenol-polyethylene oxide-polypropylene oxides, the teaching of the '372 patent being incorporated by reference herein. Generally, it is preferable that the catalyst used to prepare the NP—$EO_x$—OH material not be removed prior to addition of the PO segments (i.e., unneutralized NP—EO should be used).

A second preferred class of nonionic surfactants found useful in the practice of the present invention are hydroxy-terminated ethylene oxide-propylene oxide adducts of a hydrophobe comprising higher molecular weight or long chain alcohols, the polyethylene oxide segment connecting the higher alcohol moiety to the polypropylene oxide segment. "Higher molecular weight" or "long chain" alcohols herein means linear or branched, saturated or unsaturated, primary or secondary alcohols having from 6 to about 24 carbon atoms generally having a molecular weight in the range of about 75 to 300, these materials sometimes being referred to as "fatty alcohols". Nonionic surfactants produced from the higher molecular weight alcohols can be represented as follows:

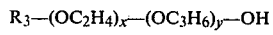

wherein $R_3$ is a linear or branched, saturated or unsaturated monovalent alcohol residue alkyl chain having from about 6 to about 24 carbon atoms (preferably 10 to 18), the values of x and y being the same as discussed above. Preferred hydrophobic long chain fatty alcohol residues for use herein include $C_{10-14}$ alcohol mixtures, $C_{12-18}$ alcohol mixtures, and $C_{14-18}$ alcohol mixtures.

As discussed above, hydroxy-terminated higher molecular weight alcohol EO—PO adducts may be prepared by adding the EO—PO polyether segments to alcohols having the desired carbon backbone. Alcohols useful herein may be synthetic alcohols (i.e., alcohols prepared by the well-known Ziegler or carbonylation processes) or alcohols generally prepared by the reduction of naturally occurring fatty acids to fatty alcohols. Useful fatty acid starting materials may be obtained from natural sources such as coconut oil, palm oil, tallow, lard, and tall oil. The carbon chain length and structure of the alcohol is determined by the synthetic conditions or the nature of the fatty acid starting material employed. Of course, specific desired alcohol structures may be obtained from natural sources by distillation or the like, or by the above synthetic methods followed by distillation. Particularly preferred higher alcohol EO—PO adducts for use in the present invention are synthesized by adding —$(EO)_{12.5}$—$(PO)_{5.0}$—OH polyether chain to a mixture of 16 carbon atom and 18 carbon atom alcohols. Thus the hydrophobe in this embodiment could be represented $C_{16-18}$.

In another preferred practice of the invention, the above liquid defoamer is mixed with mineral oil and further comprises an adjuvant amount of phosphorylated fatty or synthetic alcohol mono, di or triester ester of the structure:

$$R_4-O-\overset{\overset{O}{\|}}{\underset{\underset{H}{|}}{P}}-OH, \quad R_4-O-\overset{\overset{O}{\|}}{\underset{\underset{R_5}{|}}{P}}-OH, \quad R_4-O-\overset{\overset{O}{\|}}{\underset{\underset{R_5}{|}}{P}}-O-R_6,$$

wherein $R_4$, $R_5$ and $R_6$ may be the same or different and represent monovalent, fatty acid-derived or synthetic straight chained or branch chained, primary or secondary, saturated or unsaturated alcohol moieties.

The phosphorylated organic alcohol is prepared according to well known methods for producing phosphoric acid esters, the preferred organic alcohol moiety being $C_{16-18}$. Other alcohol moieties which may be employed include $C_{10-22}$, $C_{20+}$ or blends of these. Thus, in a preferred sense the phosphorylated organic alcohol would be mixed with the above-described defoamer and carrier (e.g., mineral oil) and the mixture of defoamer, carrier and phosphoric acid ester would be applied in a manner similar to that of the defoaming composition alone.

In a third preferred practice of the present invention, the above defoamer composition is admixed with a petroleum or synthetic wax-like material. A particularly preferred wax-like material is a synthetic, non-petroleum-derived pentaerythritol tetrastearate. It is to be emphasized that this wax-like material is to be employed in addition to the above defoamer composition (with or without the phosphorylated alcohol) in controlling foam. A particularly preferred material is available from the Cyclo Chemical Company under the trade designation Cyclochem PETS.

Various modifications and alterations of the invention will become apparent to those skilled in the art without departing from the scope and spirit of the invention, and it should be understood that this invention is not to be limited to the illustrative embodiments and examples set forth herein.

EXAMPLE 1

Illustrating the preparation of hydroxy-terminated nonylphenol—$(EO)_x$—$(PO)_y$—OH.

A purgable, pressurizable 2,000 gallon (7,500 liter) stainless steel reactor, having stirring means and a temperature control mechanism is charged with 1,614 lb. (732 kg) nonylphenol. The nonylphenol is stirred (10 min.) while nitrogen is bubbled through it. Forty-five pounds (20 kg) potassium hydroxide is added to the nonylphenol, the reactor being multiply purged (e.g., 3 times) with nitrogen and being left with a slight $N_2$ overpressure. At this point, the contents of the reactor is heated to 230° F. (110° C.) at which temperature, the reactor is again purged with dry nitrogen leaving a nitrogen overpressure. Heating of the reactants is continued to 250° F. (120° C.) at which time heating is discontinued and the vessel is multiply purged as described above. Approximately 3,070 pounds (1,390 kg) ethylene oxide is charged to the reactor at the rate of 5 gallons (19 liter) to the 12 gallons (45 liter) per minute, the rate of ethylene oxide addition and heating or cooling of the reactor being monitored to maintain the stirred reactant medium at a temperature in the range of 290° F.±10° F. (143° C.±5.5° C.). The reactor pressure should be kept to less than 60 psi (400 kPa) during EO addition. Ethylene oxide is added to the point where the nonylphenol ethylene oxide has a 1% aqueous cloud point (i.e., in a 1% aqueous solution of the material, the temperature at which the material begins to come out of solution, as evidenced by the clouding) in the temperature range of 127° F. (53° C.) to 137° F. (58° C.). After completion of the EO addition, the mixture is permitted to react at 290° F.±(143° C.) for 15 to 30 minutes. Next, PO is added until the 1% cloud point in a 20% diethyleneglycol monobutyl ether solution of the EO—PO adduct is 120° F. (48° C.) to 123° F. (50° C.). Continued addition of PO further reduces the adduct cloud point.

After PO addition, the completed product is cooled to 175° F. (79° C.) and 45 lb. (20.4 kg) glacial acetic acid is added to the product to neutralize the KOH, the product being stirred for an additional 30 min. This completes synthesis of the defoamer nonylphenol—$EO_{9.5}$—$PO_{24}$—OH.

Nonylphenol was employed to synthesize a series of surfactants of the present invention with various amounts of EO and PO using a procedure analogous to that described above. The defoaming performance of these surfactants then was measured according to the test described above. The results of this evaluation are contained in Table I.

TABLE I

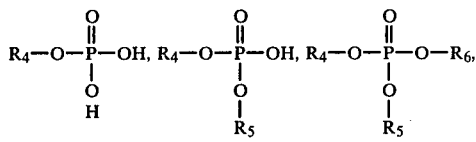

$-(EO)_x-(PO)_y-OH$

| Ratio x/y | Average value of x | Average value of y | Weight Percent NP | Weight Percent EO | Weight Percent PO | Foam Height inches | Foam Height (cm) |
|---|---|---|---|---|---|---|---|
| .17 | 1 | 6 | 34.1 | 7.4 | 58.5 | 5.0 | (12.7) |
| .08 | 1 | 12 | 21.5 | 4.7 | 73.8 | 6.0 | (15.2) |
| .06 | 1 | 18 | 15.7 | 3.4 | 80.9 | 5.9 | (14.9) |
| .04 | 1 | 24 | 12.4 | 2.7 | 84.9 | 6.1 | (15.4) |
| .5 | 3 | 6 | 29.7 | 19.3 | 51.0 | 4.7 | (11.9) |
| .25 | 3 | 12 | 19.7 | 12.8 | 67.5 | 5.4 | (13.7) |
| .17 | 3 | 18 | 14.7 | 9.6 | 75.7 | 5.3 | (13.4) |
| .13 | 3 | 24 | 11.8 | 7.6 | 80.6 | 4.9 | (12.4) |
| 2.17 | 6.5 | 3 | 30.6 | 43.1 | 26.2 | 8+ | (20.3+) |
| 1.08 | 6.5 | 6 | 24.3 | 34.2 | 41.6 | 7.8 | (19.8) |
| .72 | 6.5 | 9 | 20.1 | 28.3 | 51.6 | 7.2 | (18.3) |
| .54 | 6.5 | 12 | 17.1 | 24.1 | 58.7 | 5.5 | (13.9) |
| .36 | 6.5 | 18 | 13.2 | 18.7 | 68.1 | 5.2 | (13.2) |
| .27 | 6.5 | 24 | 10.8 | 15.2 | 74.0 | 4.5 | (11.4) |
| .22 | 6.5 | 30 | 9.1 | 12.8 | 78.1 | 4.25 | (10.7) |
| 1.58 | 9.5 | 6 | 20.9 | 43.1 | 35.9 | 8+ | (20.3+) |
| .79 | 9.5 | 12 | 15.4 | 31.7 | 52.8 | 8+ | (20.3+) |
| .53 | 9.5 | 18 | 12.2 | 25.1 | 62.7 | 8+ | (20.3+) |
| .40 | 9.5 | 24 | 10.1 | 20.8 | 69.1 | 1.0 | (2.5) |
| .32 | 9.5 | 30 | 8.6 | 17.7 | 73.7 | 1.95 | (4.9) |
| .26 | 9.5 | 36 | 7.5 | 15.4 | 77.1 | 1.0 | (2.5) |
| .20 | 9.5 | 48 | 6.0 | 12.3 | 81.8 | 1.9 | (4.9) |
| .63 | 12.5 | 20 | 10.6 | 28.8 | 60.6 | 7.8 | (19.8) |
| .42 | 12.5 | 30 | 8.1 | 22.1 | 69.8 | 2.3 | (5.8) |
| .31 | 12.5 | 40 | 6.6 | 17.9 | 75.5 | 0.5 | (1.3) |
| .25 | 12.5 | 50 | 5.6 | 15.1 | 79.4 | 0.3 | (0.7) |
| 2.5 | 15 | 6 | 16.8 | 54.5 | 28.7 | 8+ | (20.3+) |
| 1.25 | 15 | 12 | 13.0 | 42.3 | 44.6 | 8+ | (20.3+) |
| .83 | 15 | 18 | 10.6 | 34.6 | 54.7 | 8+ | (20.3+) |
| .63 | 15 | 24 | 9.0 | 29.3 | 61.7 | 8+ | (20.3+) |
| 5.0 | 30 | 6 | 10.8 | 70.6 | 18.6 | 8+ | (20.3+) |
| 2.5 | 30 | 12 | 9.1 | 59.5 | 31.4 | 8+ | (20.3+) |
| 1.67 | 30 | 18 | 7.9 | 51.4 | 40.7 | 8+ | (20.3+) |
| 1.25 | 30 | 24 | 7.0 | 45.3 | 47.8 | 8+ | (20.3+) |
| 0 | 1 | 0 | 82.2 | 17.8 | 0 | — | — |
| 0 | 3 | 0 | 60.6 | 39.4 | 0 | — | — |
| 0 | 6.5 | 0 | 41.5 | 58.5 | 0 | 8+ | (20.3+) |
| 0 | 9.5 | 0 | 32.7 | 67.3 | 0 | 8+ | (20.3+) |
| 0 | 12.5 | 0 | 27.0 | 73.0 | 0 | 8+ | (20.3+) |
| 0 | 15 | 0 | 23.5 | 76.5 | 0 | 8+ | (20.3+) |
| 0 | 30 | 0 | 13.3 | 84.7 | 0 | 8+ | (20.3+) |

EXAMPLE 2

For purposes of comparison of defoaming properties, a series of material having the following compositions (in percent by weight) were prepared and tested.

| | | |
|---|---|---|
| 1. | $C_{16-18}$—(EO)$_5$—(PO)$_{13}$—OH | 20.0 |
| | mineral seal oil | 80.0 |
| 2. | nonylphenol-(EO)$_{12.5}$—(PO)$_{50}$—OH | 20.0 |
| | mineral seal oil | 80.0 |
| 3. | water | 63.5 |
| | mineral seal oil | 10.0 |
| | "Gantrez AN 149"* | 1.5 |
| | nonylphenol-(EO)$_{9.5}$—(PO)$_{50}$ | 20.0 |
| | $C_{16-18}$—OPO$_3$H$_2$ | 5.0 |
| 4. | mineral seal oil | 75.0 |
| | cyclohexanol | 10.0 |
| | nonylphenol-(EO)$_{12.5}$—(PO)$_{50}$—OH | 10.0 |
| | $C_{16-18}$—OPO$_3$H$_2$ | 5.0 |
| 5. | water | 58.2 |
| | pentaerythritol tetrastearate | 4.0 |
| | nonylphenol-(EO)$_{12.5}$—(PO)$_{50}$—OH | 10.0 |
| | Gantrez AN 149 | 2.0 |
| | sodium hydroxide | 0.8 |
| | 100 S.U.S. naphthenic oil | 25.0 |

*(a maleic anhydride copolymer emulsion stabilizer commercially available from GAF Company)

All defoaming tests were run with 160 ppm of the respective compositions, there being from 100 to 600 ppm nonylphenol—(EO)$_{9.5}$—OH high foaming surfactant. The results of this comparison are shown in Table II, the numbers being foam heights obtained one minute after each incremental addition of the high foaming surfactant.

TABLE II

| Composition number | nonylphenol-(EO)$_{9.5}$—OH, ppm | | | | | |
|---|---|---|---|---|---|---|
| | 100 | 200 | 300 | 400 | 500 | 600 |
| Control | 8+ | — | — | — | — | — |
| 1 | 3.75 | 7.0 | 8.0 | — | — | — |
| 2 | 1.0 | 3.0 | 6.5 | 8.0 | — | — |
| 3 | 0.75 | 3.0 | 5.5 | 8.0 | — | — |
| 4 | 0.5 | 1.0 | 2.0 | 3.9 | 6.5 | 7.5 |
| 5 | 0 | 0.5 | 1.0 | 1.5 | 2.2 | 3.2 |

These foam height measurements of Table II were taken at 70° F. (21° C.) and a pump pressure of 6 PSI (41 kPa). It should be noted that composition 4, which is a composition within the scope of the present invention containing an added phosphorylated $C_{16-18}$ long chain alcohol exhibited adequate defoaming performance. Composition 3 (employing Gantrez AN149 as emulsion stabilizer) is a stabilized oil-in-water emulsion which shows acceptable defoaming behavior at low concentrations of high foaming nonylphenol—(EO)$_{9.5}$—OH. Composition 5 (also employing Gantrez AN 149) is another stabilized oil-in-water emulsion within the scope of this invention containing an added pentaerythritol tetrastearate synthetic wax which shows the best defoaming behavior.

EXAMPLE 3

Further runs were made using 100 ppm of the nonylphenol—(EO)$_x$—(PO)$_y$—OH material without mineral seal oil (i.e., in water). Fifty ppm nonylphenol—(EO)$_{9.5}$—OH was the high foaming surfactant employed, fifteen minute averages in 70° F. (21° C.) water at 6 psi (41 kPa) being measured. Defoaming characteristics (i.e., foam height measurements in inches) are shown in Table III.

TABLE III

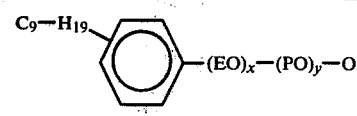

| Value of | | Foam height | |
|---|---|---|---|
| x | y | inches | (cm) |
| 10 | 18 | 8 | (20.3) |
| 10 | 25 | 7 | (17.7) |
| 10 | 35 | 7 | (17.7) |
| 10 | 50 | 5.7 | (14.5) |
| 12.5 | 20 | 8 | (20.3) |
| 12.5 | 30 | 4.4 | (11.2) |
| 12.5 | 40 | 3.4 | (8.6) |
| 12.5 | 50 | 3.2 | (8.1) |

EXAMPLE 4

Long chain alcohol hydrophobe—(EO))$_x$—(PO)$_y$—OH materials were tested for their effacacy in foam inhibition. These tests were run at 70° F. (21° C.) the defoamers all being mixed with 80% by weight mineral seal oil. The results of these tests are shown in Table IV.

TABLE IV

| Long chain alcohol | Moles EO | Moles PO | Foam height | |
|---|---|---|---|---|
| | | | inches | (cm) |
| $C_{10-14}$ | 3 | 3 | 7.5 | (19.0) |
| | 3 | 6 | 6.1 | (15.4) |
| | 3 | 9 | 5.9 | (14.9) |
| | 3 | 12 | 5.3 | (13.4) |
| | 5 | 6 | 7.8 | (19.8) |
| | 5 | 9 | 7.0 | (17.8) |
| | 5 | 12 | 6.0 | (15.2) |
| | 7 | 12 | 7.2 | (18.3) |
| | 7 | 0 | 8 | (20.3) |
| $C_{12-18}$ | 3 | 6 | 5.5 | (13.9) |
| | 3 | 9 | 5.1 | (12.9) |
| | 3 | 12 | 5.0 | (12.7) |
| | 5 | 12 | 5.5 | (13.9) |
| | 5 | 0 | 8 | (20.3) |
| $C_{14-18}$ | 3 | 6 | 5.1 | (12.9) |
| | 3 | 9 | 5.1 | (12.9) |
| | 3 | 12 | 3.8 | (9.6) |
| | 5 | 0 | 8 | (20.3) |
| | 5 | 12 | 5.8 | (14.7) |
| | 7 | 0 | 8 | (20.3) |

What is claimed is:

1. A process for inhibiting foam in an aqueous liquid having a tendency to do so, the process comprising the step of adding to the liquid a defoamer in an amount effective to reduce or eliminate foam, the defoamer consisting essentially of polyether chain consisting essentially of polyethylene oxide block or chain comprising an average of about 9.5 to 12.5 moles of ethylene oxide, the polyethylene oxide chain having attached on one end thereof poly 1,2-propylene oxide block or chain comprising 20 to 50 moles 1,2-propylene oxide, the propylene oxide chain being hydroxyl-terminated, the remaining end of the polyethylene oxide chain being attached to an alkylphenol hydrophobe, wherein the ratio of moles of ethylene oxide to moles of 1,2-propylene oxide is no greater than about 0.42:1.

2. A process according to claim 1 wherein the alkylphenol hydrophobe is of the structure

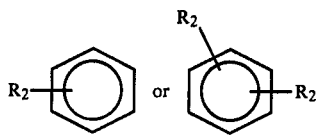 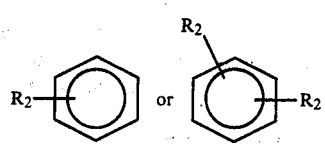

wherein $R_2$ is linear or branched, saturated or unsaturated monovalent hydrocarbon radical having from 6 to 18 carbon atoms.

3. The process according to claim 2 wherein $R_2$ has from 8 to 12 carbon atoms.

4. A process according to claim 2 wherein $R_2$ is of the structure $C_aH_{2a+1}$, "a" having a value in the range of about 6 to 18.

5. A process according to claim 5 wherein "a" is in the range of 8 to 12.

6. A process according to claim 2 wherein the alkylphenol hydrophobe is nonylphenol.

7. A process according to claim 2 wherein the alkylphenol hydrophobe is dodecylphenol.

8. A process according to claim 1 wherein the liquid is the aqueous processing stream of a paper mill or pulp mill.

9. A process according to claim 1 wherein the defoamer further comprises mono, di, or tri alcohol phosphate ester.

10. A process according to claim 9 wherein the defoamer further comprises $C_{16-18}$ alcohol mono, di, or tri phosphate ester.

11. A process according to claim 1 wherein the defoamer further comprises a wax-like material.

12. A process according to claim 11 wherein the wax-like material is pentaerythritol tetrastearate.

13. A process for inhibiting foam in an aqueous paper mill or pulp mill process stream, the process comprising the step of adding to the stream a foam depressing or reducing amount of a defoamer composition consisting essentially of defoamer of the structure $$R_1\text{---}(EO)_x(PO)_y\text{---}OH$$

wherein $R_1$ is an alkylphenol hydrophobe, EO is polyethylene oxide residue, x has a value in the range of about 9.5 to 12.5, PO is 1,2-propylene oxide residue and y has a value in the range of 20 to 50, wherein the ratio of moles of ethylene oxide to moles of 1,2-propylene oxide is no greater than about 0.42:1.

14. A process according to claim 13 wherein $R_1$ is a monovalent moiety having a molecular weight in the range of 100 to 350.

15. A process according to claim 13 wherein $R_1$ is an alkylphenol hydrophobe of the structure

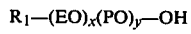

wherein $R_2$ is linear or branched, saturated or unsaturated monovalent hydrocarbon radical having from 6 to 18 carbon atoms.

16. A process according to claim 1 wherein $R_2$ has from 8 to 12 carbon atoms.

17. A process according to claim 15 wherein $R_2$ is of the structure $C_aH_{2a+1}$, "a" having a value in the range of about 6 to 18.

18. A process according to claim 15 wherein the alkylphenol hydrophobe is nonylphenol.

19. A process according to claim 15 wherein the alkylphenol hydrophobe is dodecylphenol.

20. A process according to claim 13 wherein the defoamer composition further comprises a carrier.

21. A process according to claim 20 wherein the hydrocarbon carrier is mineral seal oil.

22. A process according to claim 13 wherein the defoamer composition further comprises phosphorylated long chain alcohol.

23. A process according to claim 22 wherein the phosphorylated alcohol is a mono di or tri phosphate ester of a mixture of $C_{16-18}$ alcohols.

24. A process according to claim 13 wherein the defoamer composition further comprises a wax-like material.

25. A process according to claim 24 wherein the wax-like material comprises pentaerythritol tetrastearate.

26. A process for inhibiting foam in an aqueous pulp mill or paper mill processing stream, the process comprising the step of adding to the stream a foam depressing or a reducing amount of a defoamer composition consisting essentially of:

(a) defoamer of the structure $R_1\text{---}EO_xPO_y\text{---}OH$, wherein $R_1$ is an alkylphenol hydrophobe comprising 3-50% by weight of the defoamer, EO is polyethylene oxide residue, x has the value in the range of about 9.5 to 12.5, PO is 1,2-propylene oxide residue, and y has a value in the range of 20 to 50, the ratio of moles of ethylene oxide to moles of 1,2-propylene oxide being no greater than about 0.42:1;

(b) an organic or inorganic carrier;

(c) a phosphorylated long chain alcohol; and optionally (d) a wax-like material.

27. A process in accordance with claim 26 wherein the carrier is mineral seal oil.

28. A process in accordance with claim 26 wherein the wax-like material is pentaerythritol tetrastearate.

* * * * *

UNITED STATES PATENT AND TRADEMARK OFFICE
CERTIFICATE OF CORRECTION

PATENT NO. : 4,445,971
DATED : May 1, 1984
INVENTOR(S) : SUSAN C. LAPPI AND JAMES E. MALONEY

It is certified that error appears in the above-identified patent and that said Letters Patent are hereby corrected as shown below:

```
In column 3, line 15, for "have" read --having--.
In column 10, line 30, for "alcohol" read --alcohol moiety--.
In column 11, line 12, for "The" read --A--.
In column 11, line 18, for "claim 5" read --claim 4--.
In column 11, line 40, for "process stream" read
     --processing stream--.
In column 12, line 12, for "claim 1" read --claim 15--.
```

Signed and Sealed this

Eleventh Day of December 1984

[SEAL]

Attest:

GERALD J. MOSSINGHOFF

Attesting Officer

Commissioner of Patents and Trademarks